(12) United States Patent
Singh et al.

(10) Patent No.: US 10,989,146 B2
(45) Date of Patent: Apr. 27, 2021

(54) OIL INJECTION METHODS FOR COMBUSTION ENHANCEMENT IN NATURAL GAS RECIPROCATING ENGINES

(71) Applicant: Caterpillar Inc., Deerfield, IL (US)

(72) Inventors: Jaswinder Singh, Dunlap, IL (US); Martin Leo Willi, Dunlap, IL (US); Darryl Baldwin, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 88 days.

(21) Appl. No.: 16/180,281

(22) Filed: Nov. 5, 2018

(65) Prior Publication Data

US 2020/0141303 A1  May 7, 2020

(51) Int. Cl.
| | |
|---|---|
| *F02B 11/00* | (2006.01) |
| *F01L 3/22* | (2006.01) |
| *F02M 25/00* | (2006.01) |
| *F02B 43/12* | (2006.01) |
| *F02B 43/10* | (2006.01) |
| *F02M 21/02* | (2006.01) |

(52) U.S. Cl.
CPC ........... *F02M 21/0257* (2013.01); *F01L 3/22* (2013.01); *F02B 11/00* (2013.01); *F02B 43/12* (2013.01); *F02M 25/00* (2013.01); *F02B 2043/103* (2013.01)

(58) Field of Classification Search
CPC .... F02B 11/00; F02B 43/12; F02B 2043/103; F02B 7/06; F02M 25/00; F02M 21/0257; F01L 3/22; F01L 2810/02; F01M 3/104; F01M 9/103; F01M 9/105
USPC ...................... 123/41.76, 41.85, 188.8, 188.9
See application file for complete search history.

(56) References Cited

U.S. PATENT DOCUMENTS

| | | | | |
|---|---|---|---|---|
| 1,799,397 | A * | 4/1931 | Hamelin .................. | F02M 1/00 123/431 |
| 2,041,160 | A * | 5/1936 | Zahodiakin ............... | F01L 3/16 123/41.17 |
| 2,884,918 | A * | 5/1959 | Klug .......................... | F02D 9/00 123/445 |
| 3,297,011 | A * | 1/1967 | Gray ........................ | F02B 77/04 123/198 E |
| 3,446,313 | A * | 5/1969 | Scherenberg ............ | F01M 9/10 184/6.9 |
| 3,998,199 | A * | 12/1976 | Melchior .................. | F01L 3/08 123/188.9 |
| 4,169,488 | A * | 10/1979 | Goloff ........................ | F01L 3/18 123/188.3 |
| 4,856,484 | A | 8/1989 | Wilson et al. | |
| 4,876,988 | A * | 10/1989 | Paul ........................ | F02B 43/00 123/1 A |

(Continued)

FOREIGN PATENT DOCUMENTS

| | | | | |
|---|---|---|---|---|
| DE | 3029436 A1 * | 3/1982 | ............. | F02B 17/00 |
| FR | 2907172 A3 * | 4/2008 | ............... | F01L 3/08 |

(Continued)

*Primary Examiner* — Sizo B Vilakazi
*Assistant Examiner* — Brian R Kirby
(74) *Attorney, Agent, or Firm* — von Briesen & Roper, s.c.

(57) ABSTRACT

A system and method is provided that introduces oil droplets into the combustion chamber of a lean burn natural gas engine via dedicated channels located in the cylinder head and a valve seat insert for providing multiple distributed sources of ignition in addition to the spark plug based ignition system.

23 Claims, 5 Drawing Sheets

(56) References Cited

U.S. PATENT DOCUMENTS

| | | | | |
|---|---|---|---|---|
| 4,941,436 A | * | 7/1990 | Beer | F01L 3/22 |
| | | | | 123/41.42 |
| 5,074,256 A | * | 12/1991 | Saito | F16N 7/12 |
| | | | | 123/41.77 |
| 5,197,447 A | * | 3/1993 | Dick | F02M 31/16 |
| | | | | 123/557 |
| 5,408,978 A | * | 4/1995 | Davis | F02M 21/0239 |
| | | | | 123/527 |
| 5,870,978 A | * | 2/1999 | Willi | F02D 19/08 |
| | | | | 123/27 GE |
| 6,032,617 A | * | 3/2000 | Willi | F02D 19/061 |
| | | | | 123/27 GE |
| 6,666,185 B1 | * | 12/2003 | Willi | F02D 41/403 |
| | | | | 123/299 |
| 6,718,933 B1 | * | 4/2004 | Coates | F01L 7/02 |
| | | | | 123/190.17 |
| 7,063,051 B2 | * | 6/2006 | Schellhase | F01L 3/20 |
| | | | | 123/41.85 |
| 7,198,023 B1 | * | 4/2007 | Coates | F01L 7/10 |
| | | | | 123/299 |
| 7,389,752 B2 | | 6/2008 | Alger et al. | |
| 8,240,296 B2 | * | 8/2012 | Marushima | F01M 3/04 |
| | | | | 123/572 |
| 8,596,239 B2 | * | 12/2013 | Escriva | F01L 3/22 |
| | | | | 123/193.5 |
| 8,651,082 B2 | * | 2/2014 | Marutani | F01L 3/20 |
| | | | | 123/188.14 |
| 8,783,229 B2 | * | 7/2014 | Kim | F02D 19/061 |
| | | | | 123/455 |
| 10,024,223 B2 | | 7/2018 | Shi | |
| 2008/0314686 A1 | * | 12/2008 | Romano | F01M 1/14 |
| | | | | 184/6.5 |
| 2009/0044780 A1 | * | 2/2009 | Soverns | F01L 1/182 |
| | | | | 123/193.5 |
| 2011/0083634 A1 | * | 4/2011 | Hutchinson | F01L 3/24 |
| | | | | 123/196 R |
| 2013/0152900 A1 | * | 6/2013 | Masubuchi | F02M 21/0278 |
| | | | | 123/445 |
| 2014/0032081 A1 | * | 1/2014 | Willi | F02D 41/0057 |
| | | | | 701/104 |
| 2018/0057769 A1 | | 3/2018 | Gao et al. | |

FOREIGN PATENT DOCUMENTS

| | | | | |
|---|---|---|---|---|
| GB | 1330032 A | * | 9/1973 | F01L 13/0021 |
| JP | 04140472 A | * | 5/1992 | F02M 69/10 |
| WO | WO-2004036035 A1 | * | 4/2004 | F02M 69/10 |
| WO | WO-2014128342 A1 | * | 8/2014 | F02M 57/04 |

* cited by examiner

OIL INJECTION METHODS FOR COMBUSTION ENHANCEMENT IN NATURAL GAS RECIPROCATING ENGINES

TECHNICAL FIELD

This disclosure relates to fluid injection systems and methods for combustion enhancement in natural gas reciprocating engines. More particularly, this disclosure relates to oil injection systems and methods that introduce oil droplets or droplets of any other suitable combustible fluid into the combustion chamber of a lean burn natural gas engine via dedicated channels drilled in the cylinder head and valve seat insert(s) for providing multiple sources of ignition distributed in the combustion chamber in addition to the spark plug based ignition system. This disclosure also relates to a system and method of operating an engine in which ignition timing of distributed oil droplets can be changed using a very early spark event to combust a small amount of in-cylinder charge to alter the in-cylinder charge temperature with respect to a given piston position.

BACKGROUND

The use of gaseous fuels in internal combustion engines provides a number of advantages over other hydrocarbon fuels, such as conventional diesel. Gaseous fuels such as natural gas may be less expensive than other hydrocarbon fuels, more readily available in remote areas and may burn relatively cleaner during operation. Cleaner burning can result in a reduced amount of combustion byproducts such as carbon monoxide, oxides of nitrogen (NOx), and unburned hydrocarbons. Compression ignited as well as spark ignited gaseous fuel internal combustion engines are well known and widely used.

One way to reduce the amount of NOx produced during the combustion process is to create a lean homogeneous mixture of air, natural gas, and pilot fuel throughout the combustion chamber prior to ignition. Combustion of only lean mixtures produces a lesser quantity of NOx than does combustion of a combination of rich mixtures and lean mixtures. Once ignition is desired, a spark plug may be used to ignite the lean homogeneous mixture.

One lean burning strategy for a gaseous fuel internal combustion engine is disclosed in U.S. Pat. No. 8,783,229 to Kim et al. Kim et al. propose a method for operating an internal combustion engine which includes introducing a pilot fuel such as lubricating oil into the air intake passage. The oil droplets are earned along by the air passing through the intake passage and into the cylinder, where it is mixed with the gaseous fuel to form a combustion charge. A spark plug may be activated al the desired time to ignite the combustion charge which results in increasing the pressure and hence the temperature in the combustion chamber to a level that oil droplets distributed in the combustion chamber also get ignited, resulting in a phenomenon known as distributed ignition. This results in faster heat release from much leaner fuel air mixtures. When the engine load is high enough and the in-cylinder charge temperature is hot enough to ignite the distributed oil droplets without spark plug ignition, a sustained distributed ignition is achieved in every cycle without the help of spark plug ignition.

In the present disclosure, a method and apparatus for controlling ignition of a homogenous distribution of pilot fuel and gaseous fuel with or without a spark plug is provided.

SUMMARY

The present disclosure relates to a system and method for introducing droplets of a combustible fluid such as engine lube oil into the combustion chamber of a gaseous reciprocating engine via dedicated channels located in the cylinder head and valve seat insert(s) for providing multiple distributed sources of ignition inside combustion chamber that are ignited with or without help from a spark plug based ignition system.

In one aspect the disclosure relates to a gaseous fuel internal combustion engine assembly comprising an engine block, one or more pistons, a cylinder head, an intake conduit, one or more intake valves, a valve seat insert, an air source, a gaseous fuel source and an oil system. The engine block comprises one or more piston cylinders. The cylinder head is mounted on the engine block. The engine block, the cylinder head and each piston define a combustion chamber. Each piston is configured to move in reciprocal motion within a combustion chamber. The intake conduit is mounted to the cylinder head. The cylinder head defines one or more intake ports. Each of the one or more intake ports is in fluid communication with the intake conduit and with the combustion chamber at an outlet end. The one or more intake valves are mounted in reciprocally movable fashion to the cylinder head for selectively placing each of the one or more intake ports in fluid communication with the combustion chamber. The valve seat insert is secured to the cylinder head near the outlet end of each intake port. The valve seat insert has a valve seat surface for contacting one of the one or more intake valves when the intake valve is in a closed position. The air source is fluidly connected to the intake conduit such that the intake conduit is configured to deliver air from the air source into the one or more intake ports. The gaseous fuel source is coupled with the engine block and configured to deliver a gaseous fuel into the combustion chamber. The oil system comprises an oil pump and an oil supply conduit. The cylinder head and the valve seat insert define one or more oil channels extending through both the cylinder head and the valve seat insert. Each oil channel is in fluid communication with both the oil supply conduit and an intake valve port. Oil droplets may be introduced into the combustion chamber by injecting oil, timed with the opening of each intake valve, through each of the one or more oil channels defined by the cylinder head and the valve seat insert.

In another aspect the disclosure relates to a method of operating a gaseous fuel internal combustion engine. The engine comprises an engine block comprising one or more piston cylinders, a piston moveable in reciprocal motion within each of the one or more piston cylinders, a cylinder head mounted on the engine block wherein the engine block, the cylinder head and each of the pistons define a combustion chamber, an intake conduit mounted to the cylinder head, one or more intake ports defined by the cylinder head, each of the one or more intake ports in fluid communication with the intake conduit and with a corresponding combustion chamber at an outlet end, one or more intake valves mounted to the cylinder head in reciprocally movable fashion between an open position and a closed position for selectively placing each of the one or more intake ports in fluid communication with the corresponding combustion chamber, a valve seat insert secured to the cylinder head near the outlet end of each intake port, the valve seat insert having a valve seat surface for contacting one of the one or more intake valves when the intake valve is in the closed position, an air source fluidly connected to the intake conduit such that the intake conduit is configured to deliver air from the air source into the one or more intake ports, a gaseous fuel source coupled with the engine block and configured to deliver a gaseous fuel into the combustion chamber, and an oil system comprising an oil pump and an oil supply conduit, the valve seat insert defining one or more oil passages each oil passage in fluid communication with both the oil supply conduit and an intake valve port. The method comprises the steps of: transferring oil into the intake port via the one or more oil passages in the form of fragmented oil droplets; drawing gaseous fuel and air from the intake conduit into the intake port and then into the combustion chamber; carrying the fragmented oil droplets into the combustion chamber; positioning the one or more intake valves in the closed position; compressing the gaseous fuel, oil, and air in the combustion chamber and igniting the oil droplets, gaseous fuel and air mixture in the combustion chamber. When the engine load is high enough and the in-cylinder charge temperature is hot enough to ignite the distributed oil droplets without spark plug ignition, a sustained distributed ignition is achieved in every cycle without the help of spark plug ignition. The time of ignition of the distributed oil droplets during self-sustained distributed ignition conditions can be varied by varying the timing of a very early spark event to combust small amount of in-cylinder oil/air/fuel charge to alter its temperature in cylinder with respect to a given piston position.

In another aspect the disclosure relates to a gaseous fuel internal combustion engine assembly comprising a cylinder head defining an oil channel, an intake conduit mounted to the cylinder head, an intake port defined by the cylinder head and in fluid communication with the intake conduit, an intake valve mounted in reciprocally movable fashion to the cylinder head, and a valve seat insert mounted to the cylinder head and defining one or more oil passages, wherein each oil passage is in fluid communication with the oil channel. The valve seat insert may be generally shaped like a hollow ring and have an inner wall and an outer wall. The outer wall may define an annular groove extending around an exterior periphery of the valve seat insert, the groove being in fluid communication with the oil channel and with the one or more oil passages.

DETAILED DESCRIPTION

While the system described herein may be embodied in many forms, there is shown in the drawings and will herein be described in detail one or more embodiments with the understanding that this disclosure is to be considered an exemplification of the principles of the system and is not intended to limit the disclosure to the illustrated embodiments. Aspects of the different embodiments can be combined with or substituted for one another.

Stray lube oil droplets distributed in the combustion chamber of a natural gas reciprocating engine have been known to self-ignite and result in abnormal combustion causing earlier and rapid heat release. This droplet self-ignition happens in addition to spark-ignition and is typically prevalent at higher operating loads. If enough oil droplets are made available in the combustion chamber for every engine cycle at higher operating loads, they can become a self-sustaining and sole source of ignition, allowing spark-plug ignition to be turned off as long as engine is running at higher load. The oil droplets can be introduced in the combustion chamber by injecting very small quantity of oil, timed with valve opening, through fine interconnected channels made in the cylinder head and valve seat inserts of the intake valves.

Figure 1:
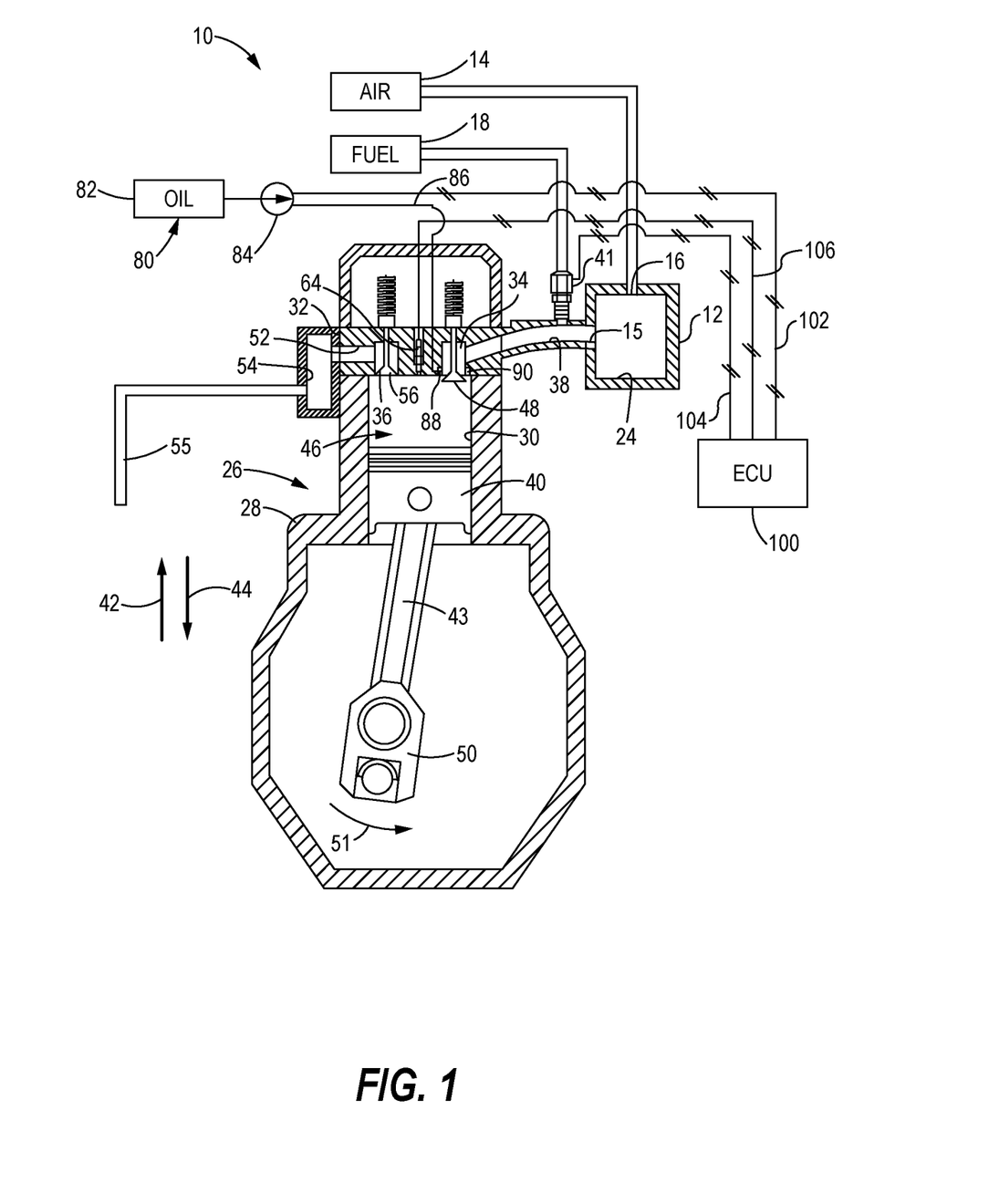
FIG. 1 is a partial cross sectional, partial schematic view of a gaseous fuel combustion engine which incorporates the features of the present disclosure.

Turning to the drawings, where like numerals indicate like elements, there is shown in FIG. 1 an engine assembly 10. The engine assembly 10 includes a plenum member 12, and an air source 14. The plenum member 12 has an inlet opening 16, and an exit opening 15 defined therein. The air source 14 supplies air to the inlet opening 16. Air from the air source 14 advances into a plenum chamber 24 defined in the plenum member 12 via the inlet opening 16.

The engine assembly 10 further includes a cylinder assembly 26. The cylinder assembly 26 includes an engine block 28 having one or more piston cylinders 30. A cylinder head 32 is secured to the engine block 28. The cylinder head 32 defines one or more intake ports 34 and one or more exhaust ports 36. An intake conduit 38 places the intake port(s) 34 in fluid communication with the exit opening 15 of the plenum member 12. An exhaust passage 52 places the exhaust port(s) 36 in fluid communication with an exhaust manifold 54.

The engine assembly 10 further includes a piston 40 which moves in reciprocal motion within the piston cylinder 30 in the general directions of arrows 42 and 44. As the piston 40 moves downwardly in the general direction of arrow 44 to the position shown in FIG. 1, a connecting rod 43 urges a crankshaft 50 to rotate in the general direction of arrow 51. Subsequently, as the crankshaft 50 continues to rotate in the general direction of arrow 51, the crankshaft 50 urges the connecting rod 43 and the piston 40 in the general direction of arrow 42 to return the piston 40 to the uppermost position (not shown).

The piston 40, the piston cylinder 30, and the cylinder head 32 cooperate to define a combustion chamber 46. In particular, when the piston 40 is advanced in the general direction of arrow 42, the volume of the combustion chamber 46 is decreased. On the other hand, when the piston 40 is advanced in the general direction of arrow 44, the volume of the combustion chamber 46 is increased as shown in FIG. 1.

The engine assembly 10 further includes a gaseous fuel source 18 in fluid communication with the intake conduit 38. A gaseous fuel supply valve 41 controls the amount of gaseous fuel, such as natural gas, advanced to the intake conduit 38. In particular, the gaseous fuel supply valve 41 moves between an open position, which advances gaseous fuel to the intake conduit 38, and a closed position, which prevents advancement of gaseous fuel to the intake conduit 38. It should be appreciated that the amount of gaseous fuel advanced by the gaseous fuel supply valve 41 controls the ratio of air to gaseous fuel, or air/fuel ratio, advanced to the combustion chamber 46.

It is noted that other methods of introducing the gaseous fuel and air mixture to the combustion chamber 46 may be used without deviating from the spirit and scope of the present disclosure. For example, the gaseous fuel may be mixed with air at any point from the air source 14 through the intake conduit 38, including upstream of a turbocharger (not shown). Alternatively, the gaseous fuel may be injected directly into the combustion chamber 46, and subsequently mixed with the intake of air.

The engine assembly 10 further comprises a spark plug 64, configured to ignite the gaseous fuel and air mixture within the combustion chamber. The spark plug 64 enables engine assembly 10 to precisely control ignition of the fuel and air mixture, even during very lean fuel ratios. Ignition of the spark plug 64 allows for precise control of combustion in a distributed ignition engine at low equivalence ratios, such as 0.5 and below. It should be appreciated that any type of spark plug may be used, such as a J-gap, multi-torch, pre-chamber, or laser, for example. It should also be appreciated that even a micro-pilot fuel injector, which auto-ignites the fuel in the absence of a spark, may be used.

An intake valve 48 mounted in reciprocally movable fashion to the cylinder head 32 selectively places the plenum chamber 24 in fluid communication with the combustion chamber 46. The intake valve 48 is actuated in a known manner by a camshaft (not shown), a pushrod (not shown), a rocker arm (not shown) driven by rotation of the crankshaft 50, or any valve actuation system that may be operated hydraulically, electronically, or pneumatically, for example. When the intake valve 48 is placed in the open position (shown in FIG. 1), air and gaseous fuel are advanced from the intake conduit 38 to the combustion chamber 46 via the intake port 34. When the intake valve 48 is placed in the closed position (not shown), gaseous fuel and air are prevented from advancing from the intake conduit 38 to the combustion chamber 46 since the intake valve 48 blocks fluid flow through the intake port 34.

An exhaust valve 56 selectively places the exhaust manifold 54 in fluid communication with the combustion chamber 46. The exhaust valve 56 is actuated in a known manner by a camshaft (not shown), a pushrod (not shown), a rocker arm (not shown) driven by rotation of the crankshaft 50, or any valve actuation system that may be operated hydraulically, electronically, or pneumatically, for example. When the exhaust valve 56 is placed in the open position (not shown), exhaust gases are advanced from the combustion chamber 46 to the exhaust manifold 54 via a fluid path that includes the exhaust port 36 and the exhaust passage 52. From the exhaust manifold 54, exhaust gases are advanced to an exhaust conduit 55. When the exhaust valve 56 is placed in the closed position (shown in FIG. 1), exhaust gases are prevented from advancing from the combustion chamber 46 to the exhaust manifold 54 since the exhaust valve 56 blocks fluid flow through the exhaust port 36.

Although only one intake valve 48 and one exhaust valve 56 are shown in FIG. 1, it should be understood that there may be more than one intake valve 48 and more than one exhaust valve 56 per combustion chamber 46. Likewise, there may be more than one intake port 34 and more than one exhaust port 36 per combustion chamber 46. For example, two intake ports 34 and two exhaust ports 36 are shown in FIG. 2.

Combustion of the mixture of gaseous fuel and air in the combustion chamber 46 produces a number of exhaust gases. After the mixture of gaseous fuel and air is combusted in the combustion chamber 46, exhaust gases are advanced through the exhaust passage 52. Included among the exhaust gases are quantities of oxides of nitrogen ("NOx").

The engine assembly 10 further includes an oil system 80 having an oil sump 82, an oil pump 84 and an oil supply conduit 86. In the embodiment shown, the oil sump 82 is depicted as a component separate from the oil pan which would typically be coupled with engine block 28. It should be appreciated, however, that in certain embodiments, the oil sump might include or be connected with an engine oil pan or the like.

Figure 2:
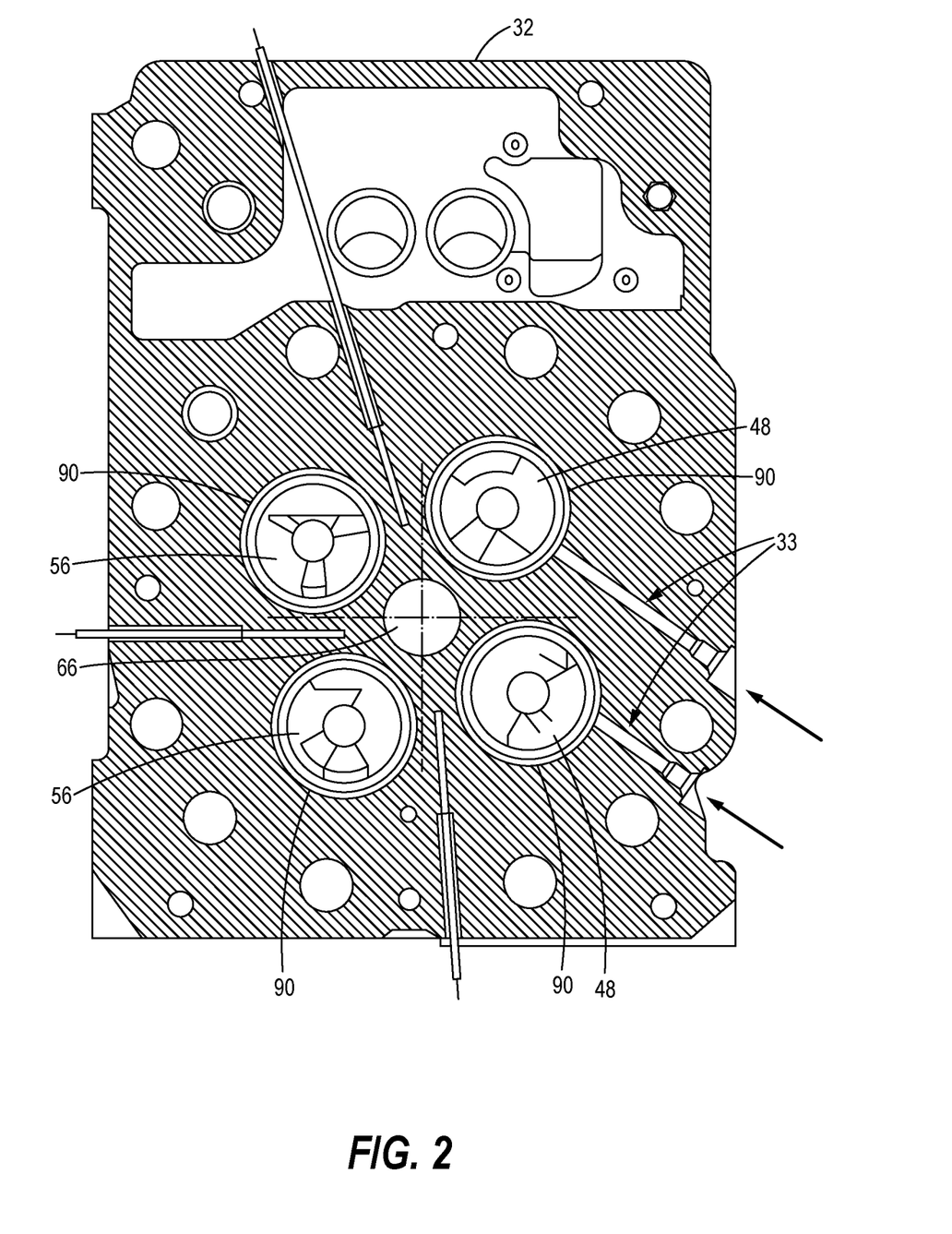
FIG. 2 is a cross-sectional view of a cylinder head according to the disclosure.

FIG. 2 is a cross-sectional view of a cylinder head 32 according to the disclosure. The viewer is "looking up" from within a combustion chamber so that the intake valves 48 and the exhaust valves 56 are clearly seen. The cylinder head 32 defines a spark plug opening 66 for accommodating a spark plug 64 (not shown).

A valve seat insert 90, described in more detail below, is secured to the outlet end 35—the end nearest the combustion chamber 46—of each intake port 34. A valve seat insert 90 also may be secured to the inlet end of each exhaust port 36.

The cylinder head 32 also defines one or more fine (narrow diameter) oil channels 33, the purpose of which are explained below. Each oil channel 33 may extend through the cylinder head 32 and terminate at the valve seat insert 90. Thus each oil channel 33 is in fluid communication with both the oil supply conduit 86 and the intake valve port 34.

Figure 3:
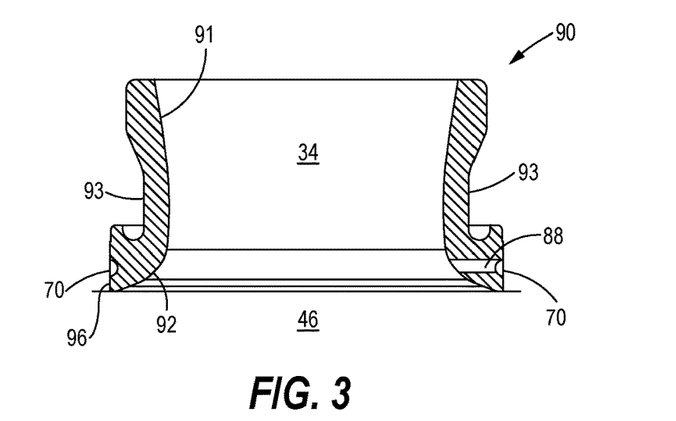
FIG. 3 is a cross sectional view of a valve seat insert according to the disclosure.

FIG. 3 is a cross sectional view of a valve seat insert 90. The valve seat insert 90 may be generally shaped like a hollow ring, and has an inner wall 91 and an outer wall 93. The inner wall 91 includes a slanted valve seat surface 92 located at the bottom (outlet) end 96 of the valve seat insert 90 near the combustion chamber 46.

The outer wall 93 of the valve seat insert 90 may define an annular groove 70 extending around the exterior periphery of the valve seat insert 90. The groove 70, shown in profile, may be machined along the periphery of the outer wall 93 near the bottom end 96 of the valve seat insert 90. The groove 70 preferably is semi-circular in cross section and faces outward.

The valve seat insert 90 defines one or more oil passages 88 that communicate with (extend between) the annular groove 70 and the intake port 34 for transferring oil or other combustible fluid from the groove 70 to the intake port 34 and ultimately to the combustion chamber 46 as explained in more detail below with respect to FIG. 6. Each oil passage 88 may be drilled through or otherwise formed in the valve seat insert 90 with an upstream end communicating with the groove 70 and a downstream end communicating with the inner wall 91 of the valve seat insert 90, and thus, the intake port 34.

Figure 4:
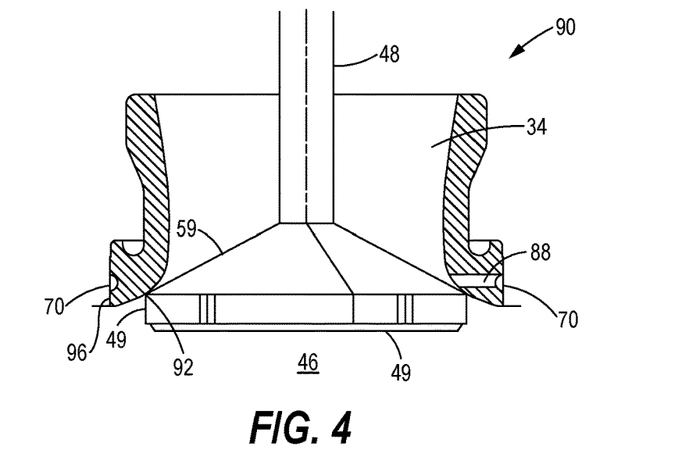
FIG. 4 is a cross sectional view of the valve seat insert of FIG. 3 and an intake valve in the closed position.

FIG. 4 is a cross sectional view of the valve seat insert 90 of FIG. 3 and an intake valve 48 in the closed position. The valve seat surface 92 contacts the rear surface 59 of the intake valve head 49 when the intake valve 48 is in the closed position, thereby helping to maintain a pressure within the combustion chamber 46 when the intake valve 48 is in the closed position. When the intake valve 48 is in the closed position, the oil passage 88 is cut off from the combustion chamber 46.

Figure 5:
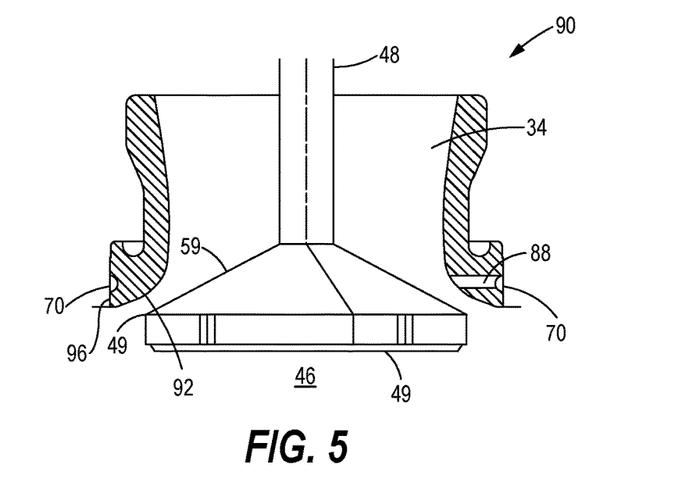
FIG. 5 is a cross sectional view of the valve seat insert with the intake valve in the open position.

FIG. 5 is a cross sectional view of the valve seat insert 90 of FIG. 3 and an intake valve 48 in the open position. When the intake valve 48 is in the open position, the oil passage 88 is in fluid communication with the combustion chamber 46 and oil droplets may enter the intake valve port 34 and then into the combustion chamber 46.

Figure 6:
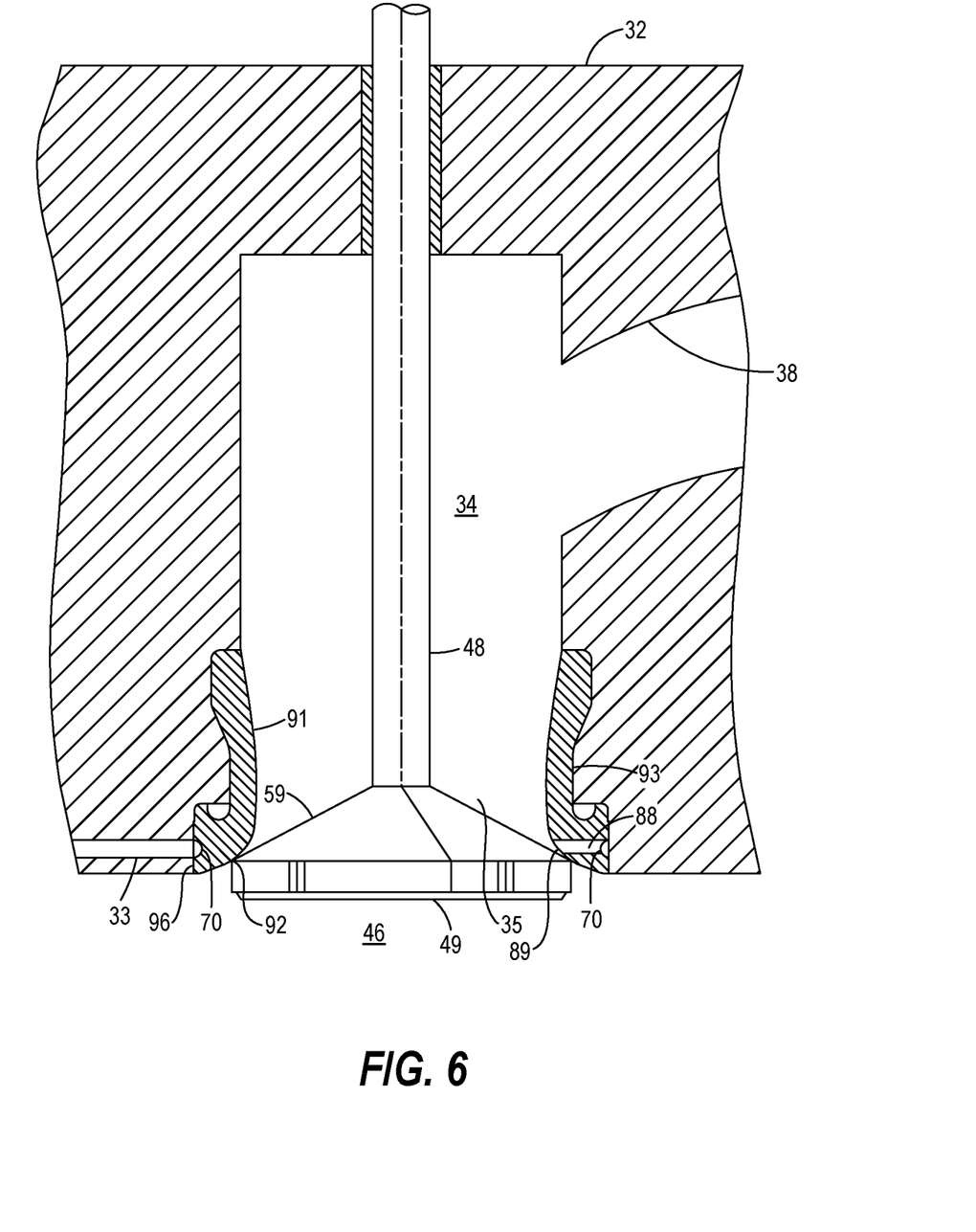
FIG. 6 is an enlarged cross sectional view of a portion of the gaseous fuel combustion engine of FIG. 1.

FIG. 6 is an enlarged cross sectional view of a portion of the gaseous fuel combustion engine 10 of FIG. 1. The intake valve 48 is shown in the closed position, with its rear surface 59 contacting the valve seat surface 92 of the valve seat insert 90. Oil or other combustible fluid flowing through the oil channel 33 and entering the groove 70 may first fill up in the groove 70 and then flow through the one or more oil passages 88 and into the intake port 34. Each oil passage 88 has an outlet 89 located on the inner wall 91 above the valve seat surface 92 so that the oil passage 88 communicates with the intake port 34 even when the intake valve 48 is closed.

The groove 70 is configured to avoid any alignment issues between the oil channel 33 in the cylinder head 32 and the oil passage 88 in the valve seat insert 90. That is, since the groove 70 extends around the exterior periphery of the valve seat insert 90 and the oil channel 33 in the cylinder head 32 feeds oil into the groove 70, the oil channel 33 may or may not be linearly aligned with any of the one or more oil passages 88 in the valve seat insert 90. For example, in FIG. 6 the oil channel 33 and the oil passage 88 are shown spaced 180 degrees apart. Oil from the oil channel 33 enters the groove 70 on one side of the valve seat insert 90—which happens to be on the left in FIG. 6—then fills up the groove 70 before exiting the groove 70 through an oil passage 88 on the diametrically opposite side of the valve seat insert 90.

The groove 70 also allows the oil channel 33 in the cylinder head 32 to feed multiple oil passages 88 in the valve seat insert 90. For example, the number of oil channels 33 may be one while the number of oil passages 88 is more than one.

If the valve seat insert 90 defines multiple oil passages, the arrangements of the oil passages 88 with respect to each other may vary. The oil passages 88 may or may not be spaced equally apart around the valve seat insert 90. For example and without limitation, the valve seat insert 90 may define eight oil passages 88 spaced equally apart every 45 degrees, four oil passages 88 spaced equally apart every 90 degrees, or two oil passages 88 spaced 180 degrees apart.

By way of further example, two oil passages 88 may be drilled on the same general side of the valve seat insert 90 but in a configuration that causes the oil from each oil passage 88 to impinge on the oil stream from the other oil passage 88. The orientation and location of the oil passages 88 on the valve seat insert may also be coordinated appropriately depending upon the amount of swirl used on the intake.

In operation, oil droplets may be introduced into the combustion chamber 46 by injecting a very small quantity of oil, timed with the opening of the intake valve 48, through each of the one or more oil passages 88 defined by the cylinder head 32 and the valve seat insert 90.

Alternatively or in addition to intermittent flow, a small quantity of oil or other combustible fluid may be supplied continuously. In such a case, some oil will accumulate on the rear surface 59 of the intake valve head 49 and will shear off in the form of smaller droplets and carried into the combustion chamber 46 by the incoming high velocity air-fuel mixture in the intake 34 port.

The one or more oil passages 88 may extend substantially radially through the valve seat insert 90. That is, the oil passages 88 may extend in a line that is normal (perpendicular) to the cylindrical portion of the valve seat insert outer wall 93 so that the oil droplets enter the intake valve port 34 in a radial direction. However, the oil passages 88 could extend at an oblique angle with respect to the valve seat insert outer wall 93 so that the oil enters the intake valve port 34 at an angle to the radial direction.

Referring again to FIG. 1, the engine assembly 10 may further include a controller 100. The controller 100 is preferably a microprocessor-based engine control unit (ECU). The controller 100 may be used to control the amounts of fuel and oil entering the combustion chamber 46. For example, the controller 100 may send a control signal via a first signal line 102 to the oil pump 84 to control the timing and quantity of oil introduced into the combustion chamber 46.

Thus, the controller 100 may send a signal to the oil pump 84 to inject oil through each of the one or more oil passages 88 and into the intake port 34 only when the intake valve 48 is open. Alternatively, the controller 100 may send a signal to the oil pump 84 to inject oil continuously through each of the one or more oil passages 88 and into the intake port 34.

The controller 100 may send a control signal via a second signal line 104 to the gaseous fuel supply valve 41 to control the quantity of fuel introduced into the intake conduit 38 and/or combustion chamber 46. Specifically, if it is desired to advance a leaner mixture to the combustion chamber 46, a gaseous fuel control signal received via the second signal line 104 causes the gaseous fuel supply valve 41 to operate so as to advance less gaseous fuel to the intake conduit 38. On the other hand, if it is desired to advance a richer mixture of air and gaseous fuel to the combustion chamber 46, a gaseous fuel control signal received via the second signal line 104 causes the gaseous fuel supply valve 41 to operate so as to advance more gaseous fuel to the intake conduit 38.

The controller 100 may also control ignition timing. For example, the controller 100 may send a control signal via a third signal line 106 to the spark plug 64 to precisely control ignition of the fuel and air mixture within combustion chamber 46.

INDUSTRIAL APPLICABILITY

In operation, the typical engine assembly 10 operates in a four-stroke cycle, which includes an intake stroke, a compression stroke, a power stroke, and an exhaust stroke. Although the below discussion pertains specifically to a four-stroke engine, the principles of the present disclosure may apply as well to other types of engines, such as a two-stroke engine.

The first stroke is the intake stroke, during which the exhaust valve 56 is positioned in the closed position and the intake valve 48 is positioned in the open position as shown in FIG. 1. During the intake stroke, the piston 40 is advanced downwardly in the general direction of arrow 44 thereby creating a low pressure in the combustion chamber 46. This low pressure draws gaseous fuel and air from the intake conduit 38 downwardly into the combustion chamber 46 so as to form a homogeneous mixture of air and gaseous fuel in the combustion chamber 46.

In one particular aspect of operation, at some point during either the exhaust or compression stroke, oil is transferred into the intake port 34 via oil pump 84. It is believed that the oil from the oil passage 88 is directed onto the rear surface 59 of the closed intake valve head 49, then, when the intake valve 48 opens during the intake stroke, the high pressure air and gaseous fuel mixture moving through the intake port 34 will shear off the oil and carry the oil into the combustion chamber 46 in the form of fragmented particles or droplets.

Advancing to the compression stroke, the intake valve 48 and the exhaust valve 56 are both positioned in their respective closed positions. As the piston 40 moves upwardly in the general direction of arrow 42, it compresses gaseous fuel, oil, and air in the combustion chamber 46. At a time during the compression stroke, the spark plug 64 ignites so as to ignite the relatively homogenous mixture of gaseous fuel, oil and air.

When the engine operating load is sufficiently high enough, the charge density, that is, the density of the oil/air/fuel mixture, in the combustion chamber 46 may increase for a given piston position. As the piston 40 moves up during the compression stroke, the temperature of the air/fuel mixture goes up as well. Once the engine load is high enough, and the oil/air/fuel mixture temperature during compression is high enough (i.e., at about the ignition point of the oil droplets), the oil droplets will self-ignite on their own, without a spark. This self-ignition of the oil droplets will occur during every piston cycle if the charge temperature is high enough. In other words, during every piston cycle, the oil droplets self-ignite at the same time (in terms of crankshaft angle degree or piston position).

In order to meet an emission target, for example, the combustion timing may need to be advanced (or retarded). For spark plug ignition, this timing change can be accomplished via the engine controller simply by changing the spark plug timing, that is, when the spark plug 64 sparks. The controller can advance or retard the spark very easily. For non-spark ignition in which the oil droplets are self-igniting and thus are the sole source of ignition, ignition timing can be changed using a "very early spark event."

A very early spark event is one in which a small amount of the oil/air/fuel mixture in the combustion chamber 46 is ignited by a spark. The very early spark event is initiated (controlled) by the engine controller 100. The controller 100 receives information from engine sensors regarding various engine and vehicle conditions, such as temperature or pressure in the combustion chamber 46. When conditions warrant a change in combustion timing, the controller 100 sends a signal via signal line 106 to the sparkplug 64 to spark, and a small quantity of oil/air/fuel mixture is combusted. The combusted contents mix with the remaining oil/air/fuel mixture in the combustion chamber 46 and raise its temperature for a given piston position compared to if earlier spark event was not used. Upon initiating a very early spark event, the engine assembly 10 can start burning remaining distributed oil droplets and hence the air and fuel mixture earlier than would otherwise occur.

During smooth operation, the engine assembly 10 may only require the sparkplug 40 to spark when it is desired to change the timing of the ignition. If the engine assembly 10 is running smoothly with the timing that is occurring "naturally", that is, by spontaneous (spark free) ignition of the oil droplets and thus the oil/air/fuel mixture, then the engine assembly 10 does not require sparking by the sparkplug 46. However, if conditions (engine load, engine temperature, engine out emission, etc.) warrant advancing (or retarding) the timing, the engine assembly 10 does so by using the spark plug 46 to initiate a very early spark event.

Figure 7:
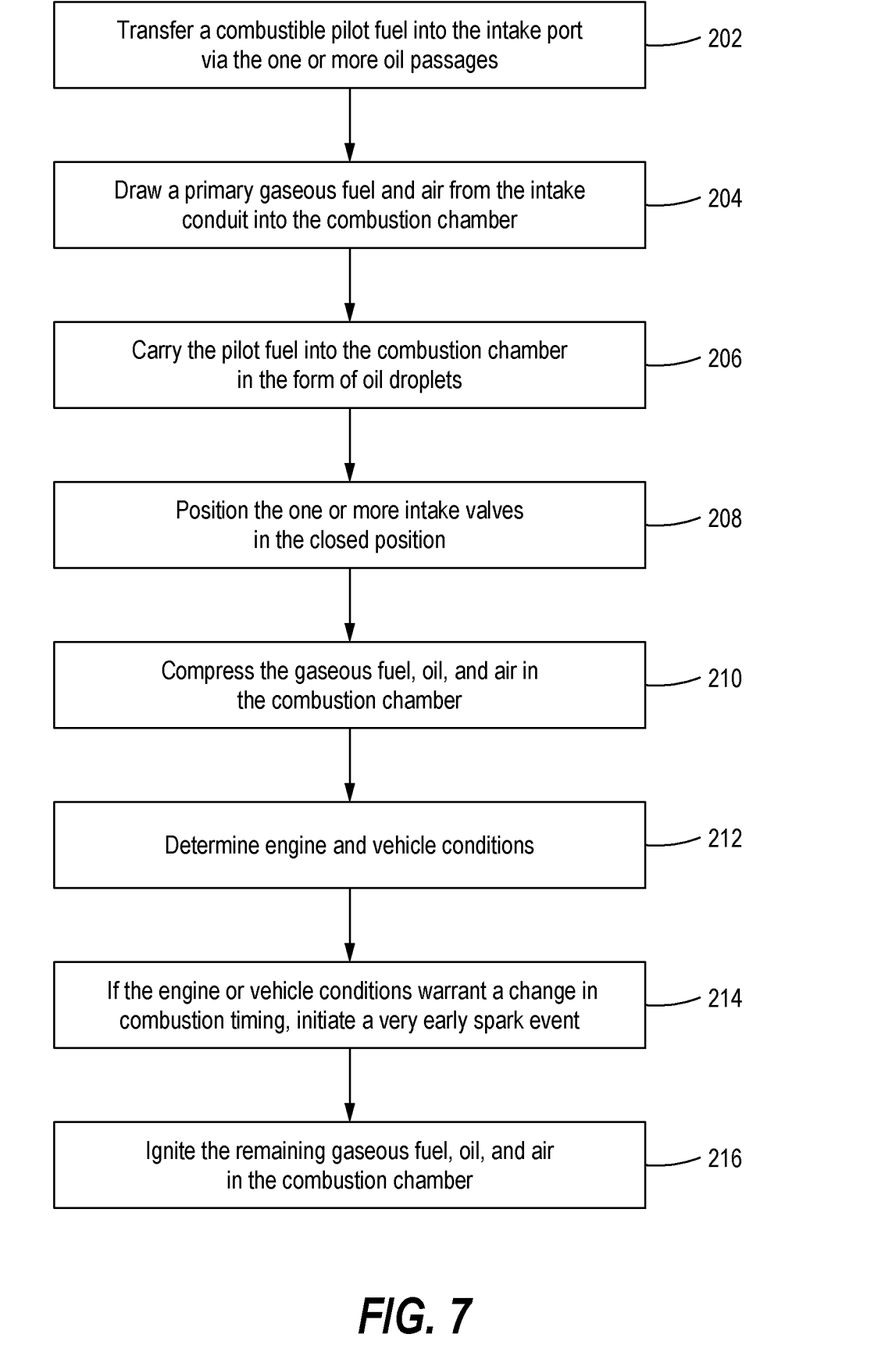
FIG. 7 is a flow chart illustrating an exemplary disclosed method performed by the engine assembly of FIG. 1.

FIG. 7 is a flow chart illustrating an exemplary disclosed method 200 performed by the engine assembly 10 of FIG. 1. The method 200 may include the following steps:

Step 202: Transfer a combustible pilot fuel, such as oil, into the intake port 34 via the one or more oil passages 88.

Step 204: Draw a primary gaseous fuel and air from the intake conduit 38 into the intake port 34 and then into the combustion chamber 46.

Step 206: Carry the oil into the combustion chamber 46 in the form of oil droplets.

Step 208: Position the one or more intake valves 48 in the closed position.

Step 210: Compress the gaseous fuel, oil, and air in the combustion chamber 46.

Step 212: Determine engine and vehicle conditions, such as engine load, temperature or pressure in the combustion chamber 46 and engine out emissions. The controller 100 may receive information from various engine sensors regarding various engine conditions.

Step 214: Determine whether engine and vehicle conditions warrant a change in combustion timing and if so, ignite a small quantity of oil/air/fuel mixture by initiating a very early spark event. This may be accomplished by the controller 100, which sends a signal via the signal line 106 to the sparkplug 64 to spark, thereby igniting a small quantity of oil/air/fuel mixture. Only a small quantity of oil/air/fuel mixture is burned during this very early spark event.

Step 216: Ignite the gaseous fuel, oil, and air in the combustion chamber 46. When the small amount of combusted oil/air/fuel mixture from step 214 mixes with the remaining charge in the combustion chamber 46, the charge temperature within the combustion chamber 46 rapidly increases. So, for the same piston position, as the piston 40 moves up during compression, there is a higher temperature within the chamber 46 than would otherwise exist without the very early spark event. Viewed another way, the very early spark event causes (results in) the same temperature in the combustion chamber 46 at an earlier piston position that would otherwise occur at a later piston position when the piston 40 is moving up. Thus the effect of the very early spark event is to advance the ignition timing of distributed oil droplets.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

The invention claimed is:

1. A gaseous fuel internal combustion engine assembly comprising: an engine block comprising one or more piston cylinders; a piston moveable in reciprocal motion within each of the one or more piston cylinders; a cylinder head mounted on the engine block; the engine block, the cylinder head and each of the pistons defining a combustion chamber; an intake conduit mounted to the cylinder head; one or more intake ports defined by the cylinder head, each of the one or more intake ports in fluid communication with the intake conduit and with a corresponding the combustion chamber at an outlet end; one or more intake valves mounted in reciprocally movable fashion to the cylinder head for selectively placing each of the one or more intake ports in fluid communication with the corresponding combustion chamber; a valve seat insert secured to the cylinder head near the outlet end of each intake port, the valve seat insert having a valve seat surface for contacting one of the one or more intake valves when the intake valve is in a closed position; an air source fluidly connected to the intake conduit; a gaseous fuel source coupled with the engine block to deliver a gaseous fuel into the combustion chamber, wherein air from the air source and gaseous fuel from the gaseous fuel source are mixed upstream from the one or more intake ports to form an air/fuel mixture that flows into the one or more intake ports; and an oil system comprising an oil sump, an oil pump drawing lubricating oil from the oil sump, and an oil supply conduit; wherein the valve seat insert defines one or more oil passages, each oil passage in fluid communication with both the oil supply conduit and an intake valve port; and wherein lubricating oil may be introduced into the combustion chamber by pumping lubricating oil through each of the one or more oil passages and into the corresponding intake port to mix with the air/fuel mixture to form an oil/air/fuel mixture.

2. The gaseous fuel internal combustion engine assembly of claim 1 wherein: the valve seat insert is generally shaped like a hollow ring and has an inner wall and an outer wall; the outer wall having an annular groove defined therein and extending around the valve seat insert; the cylinder head defines at least one oil channel in fluid communication with the oil supply conduit and the annular groove; and the one or more oil passages extend between the annular groove and the intake port.

3. The gaseous fuel internal combustion engine assembly of claim 2 wherein: the oil channel is not linearly aligned with any of the one or more oil passages in the valve seat insert.

4. The gaseous fuel internal combustion engine assembly of claim 2 wherein: the number of oil channels is one and the number of oil passages is more than one.

5. The gaseous fuel internal combustion engine assembly of claim 4 wherein: the oil passages are spaced equally apart.

6. The gaseous fuel internal combustion engine assembly of claim 2 further comprising: a controller operably connected to the oil pump, wherein the oil pump injects lubricating oil through each of the one or more oil passages and into the intake port upon receiving a signal from the controller.

7. The gaseous fuel internal combustion engine assembly of claim 1 wherein: at least one of the one or more oil passages extends substantially radially through the cylinder head and through the valve seat insert.

8. The gaseous fuel internal combustion engine assembly of claim 2 wherein: at least one of the one or more oil passages extends at an oblique angle with respect to the valve seat insert outer wall.

9. The gaseous fuel internal combustion engine assembly of claim 1 wherein: at least one of the one or more oil passages is configured so that lubricating oil from the passage impinges on an oil stream from another of the one or more oil passages.

10. The gaseous fuel internal combustion engine assembly of claim 2 wherein: the inner wall includes a slanted valve seat surface located near the outlet end of the intake port; and each of the one or more oil passages has an outlet located on the inner wall above the valve seat surface so that the oil passage communicates with the intake port even when the intake valve is closed.

11. A method of operating a gaseous fuel internal combustion engine, the engine comprising an engine block comprising one or more piston cylinders, a piston moveable in reciprocal motion within each of the one or more piston cylinders, a cylinder head mounted on the engine block wherein the engine block, the cylinder head and each of the pistons define a combustion chamber, an intake conduit mounted to the cylinder head, one or more intake ports defined by the cylinder head, each of the one or more intake ports in fluid communication with the intake conduit and with a corresponding the combustion chamber at an outlet end, one or more intake valves mounted to the cylinder head in reciprocally movable fashion between an open position and a closed position for selectively placing each of the one or more intake ports in fluid communication with the corresponding combustion chamber, a valve seat insert secured to the cylinder head near the outlet end of each intake port, the valve seat insert having a valve seat surface for contacting one of the one or more intake valves when the intake valve is in the closed position, an air source fluidly connected to the intake conduit such that the intake conduit is configured to deliver air from the air source into the one or more intake ports, a gaseous fuel source configured to deliver a gaseous fuel upstream of the one or more intake ports to mix with the air to form an air/fuel mixture that flows into the one or more intake ports, and an oil system comprising an oil sump, an oil pump drawing lubricating oil from the oil sump, and an oil supply conduit, the valve seat insert defining one or more oil passages, each oil passage in fluid communication with both the oil supply conduit and an intake valve port, the method comprising the steps of: transferring lubricating oil into the intake port via the one or more oil passages; drawing gaseous fuel and air from the intake conduit into the intake port and then into the combustion chamber; mixing the lubricating oil with the air/fuel mixture in the intake port to form an oil/air/fuel mixture and carry the lubricating oil into the combustion chamber; positioning the one or more intake valves in the closed position; compressing the oil/air/fuel mixture, in the combustion chamber; and igniting the oil/air/fuel mixture, in the combustion chamber.

12. The method of claim 11 wherein: during the transferring lubricating oil step, the lubricating oil from the oil passage is directed onto the rear surface of a head of the intake valve.

13. The method of claim 11 wherein: during the igniting step the oil/air/fuel mixture, is ignited by a spark from a spark plug.

14. The method of claim 11 wherein: during the igniting step the oil/air/fuel mixture, is ignited by self-ignition of the lubricating oil.

15. The method of claim 11 comprising the additional steps of:
   determining engine and vehicle conditions; and initiating a very early spark event if the engine or vehicle conditions warrant a change in combustion timing during self-sustained combustion supported by distributed oil droplet ignition.

16. The method of claim 15 wherein; the step of initiating a very early spark event comprises igniting a small quantity of oil/air/fuel mixture as the piston moves up during the compressing step.

17. The method of claim 11 wherein the step of transferring lubricating oil takes place continuously.

18. The method of claim 11 wherein: the step of transferring lubricating oil takes place only when the intake valve is open.

19. A gaseous fuel internal combustion engine assembly comprising: a cylinder head defining an oil channel that is in fluid communicate with an oil pump that draws lubricating oil from a fuel sump; an intake conduit mounted to the cylinder head; an intake port defined by the cylinder head and in fluid communication with the intake conduit, wherein air from an air source and gaseous fuel from a gaseous fuel source are mixed upstream of the intake port to form an air/fuel mixture; an intake valve mounted in reciprocally movable fashion to the cylinder head; and an intake valve seat insert mounted to the cylinder head and defining one or more oil passages, each oil passage in fluid communication with the oil channel, wherein lubricating oil is discharged from the oil passages into the intake port upstream of the intake valve to mix with the air/fuel mixture to form an oil/air/fuel mixture that flows past the intake valve and into a combustion chamber.

20. The gaseous fuel internal combustion engine assembly of claim 19 wherein: the intake valve seat insert is generally shaped like a hollow ring and has an inner wall and an outer wall; the outer wall having an annular groove defined therein extending around the valve seat insert, the groove being in fluid communication with the oil channel and with the one or more oil passages.

21. The gaseous fuel internal combustion engine assembly of claim 1, wherein the cylinder head defines an oil channel that is a linear bore extending from an outer surface of the cylinder head to a valve seat of a corresponding one of the intake ports in which the valve seat insert is received, wherein the oil channel does not extend through, adjacent to or around a heat source, and wherein the oil channel places the oil supply conduit in fluid communication with the one or more oil passages of the valve seat insert.

22. The method of claim 11, wherein the cylinder head defines an oil channel extending in a continuous, uninterrupted path from an outer surface of the cylinder head to a corresponding one of the intake ports, wherein the oil channel does not extend through, adjacent to or around a heat source, and wherein the oil channel places the oil supply conduit in fluid communication with the one or more oil passages of the valve seat insert, the method comprising the step of transferring lubricating oil to the one or more oil passages via the oil channel.

23. The gaseous fuel internal combustion engine assembly of claim 19, wherein the oil channel extends in a continuous, uninterrupted path from an outer surface of the cylinder head to the intake port, wherein the oil channel does not extend through, adjacent to or around a heat source, and wherein the oil channel places an oil supply conduit in fluid communication with the one or more oil passages of the intake valve seat insert.

* * * * *